United States Patent Office 2,927,945
Patented Mar. 8, 1960

2,927,945

TERTIARY PHOSPHINE OXIDES

Sheldon A. Buckler, Stamford, and Nancy E. Day, Greenwich, Conn., assignors to American Cyanamid Company, New York, N.Y., a corporation of Maine No Drawing. Application July 2, 1959
Serial No. 824,471

10 Claims. (Cl. 260—606.5)

The present invention relates to new and useful tertiary phosphine oxides which correspond to the formula

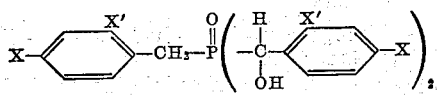

wherein the X represents hydrogen, lower alkyl ($C_1$–$C_4$), branched or straight chain, or halogen, such as chlorine, bromine, and the like, and X' represents hydrogen, or halogen, such as chlorine, bromine, and the like.

The above compounds may be readily prepared by reacting an aldehyde of the formula

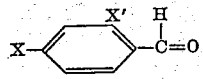

wherein X and X' have the meaning shown above, with phosphine in the presence of an aqueous mineral acid.

A typical reaction in which benzaldehyde is reacted with phosphine to produce benzyl-bis(α-hydroxybenzyl)-phosphine oxide may be illustrated as follows:

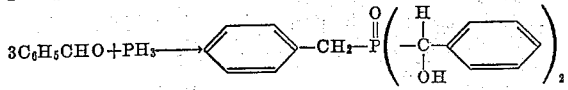

Of course, numerous substituted aldehydes of the type indicated above, including propyl-, butyl-, fluoro-, iodo-substituted aldehydes, are also contemplated herein as reactants.

The aqueous mineral acid serves both as a solvent and as a catalyst for the reaction. Suitable mineral acids are the hydrochloric, hydrobromic, sulfuric and phosphoric acids.

In general, the reaction takes place at temperatures ranging from 0° C. to about 100° C., and preferably from about 20° C. to 60° C.

While the reaction may be readily carried out in an aqueous mineral acid, inert organic solvents may also be employed in conjunction with the mineral acid, such as the lower aliphatic monohydric alcohols, tetrahydrofuran, 1,2-dimethoxyethane, dioxane and the like.

The invention will be further illustrated in conjunction with the following examples which are to be taken as illustrative only and not by way of limitation.

EXAMPLE I

*Benzyl-bis(α-hydroxybenzyl)phosphine oxide*

A solution of 42.4 g. (0.4 mole) of benzaldehyde in 150 ml. of concentrated hydrochloric acid (37.7%) was added to a suitable pressure vessel. Phosphine was continuously added to the vessel with agitation for a period of one hour. A temperature rise from 20° to 50° C. took place. The hydrochloric acid was then decanted from the solid material, and the latter was recrystallized from ethyl alcohol to give 27.7 g. (59% of theory) of product, a white crystalline compound melting at 153–155° C. Anal. calcd. for $C_{21}H_{21}O_3P$: C, 71.58; H, 6.01; P, 8.79. Found: C, 71.57; H, 6.24; P, 8.79.

EXAMPLE II

*Benzyl-bis(α-hydroxybenzyl)phosphine oxide*

A solution of 50.0 g. (0.48 mole) of benzaldehyde in 350 ml. of dioxane was prepared, and 45 ml. of concentrated hydrochloric was added. The solution was stirred in a closed reaction vessel as phosphine was passed in during a period of 90 minutes. The solution was then evaporated, and the residue was dissolved in 100 ml. of warm ethyl alcohol. Upon cooling, 33.6 g. (60% of theory) of product was deposited, M.P. 153–154° C.

EXAMPLE III

*4-methylbenzyl-bis(α-hydroxy-4-methylbenzyl) phosphine oxide*

A solution of 48 g. (0.4 mole) of 4-tolualdehyde in 100 ml. of concentrated hydrochloric acid and 50 ml. of tetrahydrofuran was stirred in a closed reaction vessel as phosphine was passed in during a period of 45 minutes. A temperature rise from 24 to 53° C. took place. Water was then added to the reaction product, and the supernatant liquid was decanted from the precipitated material. The crude solid was recrystallized from ethyl alcohol to give 29.1 g. (55% of theory) of product, a white crystalline compound melting at 167–168° C. Anal. calcd. for $C_{24}H_{27}O_3P$: P, 7.85. Found. P, 7.71.

EXAMPLE IV

*4-chlorobenzyl-bis(α-hydroxy-4-chlorobenzyl) phosphine oxide*

A solution of 42 g. (0.3 mole) of 4-chlorobenzaldehyde in 150 ml. of tetrahydrofuran and 40 ml. of concentrated hydrochloric acid was reacted with phosphine in a closed reaction vessel for a period of 50 minutes. A rise in temperature from 24 to 33° C. was noted. The solution was then evaporated, the residue stirred with water, and the supernatant liquid decanted. The resulting solid residue was recrystallized from a mixture of equal parts of water and ethyl alcohol to give 29 g. (65% of theory) of product, a white crystalline solid melting at 165–166° C. Anal. calcd. for $C_{21}H_{18}Cl_3O_3P$: Cl, 23.34; P, 6.80. Found: Cl, 23.06; P, 6.92.

EXAMPLE V

*4-isopropylbenzyl-bis(α-hydroxy-4-isopropylbenzyl)phosphine oxide*

The process of Example III, above, is repeated with the exception that 44.4 grams (0.3 mole) of 4-isopropylbenzaldehyde is substituted for 4-tolualdehyde. Crystalline 4-isopropylbenzyl-bis(α-hydroxy-4-isopropylbenzyl)-phosphine oxide is recovered.

EXAMPLE VI

*4-(n-propyl)benzyl-bis(α-hydroxy-4-(n-propyl) benzyl)phosphine oxide*

The process of Example III, above, is repeated with the exception that 44.4 grams (0.3 mole) of 4-(n-propyl)-benzaldehyde is substituted for 4-tolualdehyde. Crystalline 4 - (n - propyl)benzyl - bis(α - hydroxy - 4 - (n-propyl)benzyl)phosphine oxide is recovered.

EXAMPLE VII

*4-bromobenzyl-bis(α-hydroxy-4-bromobenzyl) phosphine oxide*

The process of Example IV, above, is repeated with the exception that 34.0 grams (0.2 mole) of 4-bromobenzaldehyde is substituted for 4-chlorobenzaldehyde. Crystalline 4 - bromobenzyl - bis(α - hydroxy - 4 - bromobenzyl)phosphine oxide is recovered.

EXAMPLE VIII

2-chlorobenzyl-bis(α-hydroxy-2-chlorobenzyl) phosphine oxide

A solution of 42 grams (0.3 mole) of 2-chlorobenzaldehyde in 150 milliliters of tetrahydrofuran and 40 milliliters of concentrated hydrochloric acid is reacted with phosphine in a closed reaction vessel for a period of 2.5 hours. A slight exotherm is noted. The solution is evaporated, the residue stirred with water, and the supernatant liquid decanted. The resulting solid is recrystallized from ethyl alcohol to give 16 grams (35 percent by weight of theory) of product, a white crystalline solid melting at 155° C.–158° C.

Analysis calculated for $C_{21}H_{18}Cl_3O_3P$: C, 55.33; H, 3.98. Found: C, 55.56; H, 4.03.

EXAMPLE IX

2,4-dichlorobenzyl-bis(α-hydroxy-2,4-dichlorobenzyl)phosphine oxide

A solution of 52.5 grams (0.3 mole) of 2,4-dichlorobenzaldehyde in 150 milliliters of tetrahydrofuran and 40 milliliters of concentrated hydrochloric acid is reacted with phosphine in a closed reaction vessel for a period of 2.5 hours. A rise in temperature from 24° C. to 35° C. is noted. The reaction mixture contains a solid and a liquid. The solid product is filtered off and recrystallized from acetonitrile-water to give a product 2,4-dichlorobenzyl - bis - (α - hydroxy - 2,4 - dichlorobenzyl)-phosphine oxide.

The tertiary phosphine oxides of the present invention have utility as intermediates in the preparation of high melting, flame-resistant thermoplastic materials. For example, a mixture of two grams of the phosphine oxide of Example I above, one gram of toluene 2,4-diisocyanate, 7 milliliters of chlorobenzene and one drop of triethylamine was heated at 150° C. for one hour. The volatile materials were then evaporated giving a colorless plastic solid which was flame-resistant. This material softened at a temperature in the range of 160° C.–174° C.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

This application is a continuation-in-part of U.S. Serial No. 751,831 filed July 30, 1958, now abandoned.

We claim:

1. Tertiary phosphine oxides of the general formula

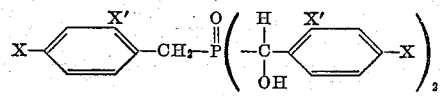

wherein X represents a member of the group consisting of hydrogen, lower alkyl ($C_1$–$C_4$), branched and straight chain, and halogen, and X' represents a member of the group consisting of hydrogen and halogen.

2. Benzyl-bis(α-hydroxybenzyl)phosphine oxide.

3. 4 - methylbenzyl - bis(α - hydroxy - 4 - methylbenzyl)phosphine oxide.

4. 4 - chlorobenzyl - bis(α - hydroxy - 4 - chlorobenzyl)phosphine oxide.

5. 2 - chlorobenzyl - bis(α - hydroxy - 2 - chlorobenzyl)phosphine oxide.

6. 2,4 - dichlorobenzyl - bis(α - hydroxy - 2,4 - dichlorobenzyl)phosphine oxide.

7. A process which comprises bringing an aldehyde of the formula

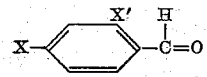

wherein X represents a member of the group consisting of hydrogen, lower alkyl ($C_1$–$C_4$), branched and straight chain, and halogen, and X' represents a member of the group consisting of hydrogen and halogen, into contact with phosphine in the presence of an aqueous mineral acid until reaction ceases, and recovering the thus-formed tertiary phosphine oxide.

8. A process according to claim 7 in which the reaction is carried out at a temperature within the range of from 0° C. to about 100° C.

9. A process according to claim 7 in which an inert organic solvent is employed in conjunction with the aqueous mineral acid.

10. A process according to claim 7 in which the reactants are present in the proportion of three mole equivalents of aldehyde to one mole equivalent of phosphine.

No references cited.